Patented Oct. 12, 1943

2,331,808

UNITED STATES PATENT OFFICE 2,331,808

COMPOSITION OF MATTER

Robert S. Shelton, Mariemont, and Marcus G. Van Campen, Jr., Silverton, Ohio, assignors to The Wm. S. Merrell Company, Reading, Ohio, a corporation of Delaware No Drawing. Application May 1, 1941,
Serial No. 391,372

1 Claim. (Cl. 260—396)

This invention relates to improvements in products having therapeutic activity similar to that of vitamin K, for use, for example, in cases of hypoprothrombinemia, i. e., reduction of prothrombin.

It is known that beta-methyl-alpha-naphthoquinone has such activity, its physiological action being similar to that of the natural vitamin K which may be isolated from alfalfa and related sources. This compound is quite insoluble in water, and hence cannot be administered by injection.

The present invention is directed to improvements which provide soluble adducts of this compound, such that it can be dissolved in water and used therapeutically by injection. The solutions of this compound which may be prepared in accordance with the present invention are quite stable, particularly if sealed in ampoules or otherwise properly protected.

In accordance with the invention, beta-alpha-naphthoquinone is treated with sodium bisulfite which renders it water soluble, with the production of solutions which may contain as much as 2 milligrams of the quinone per cubic centimeter, the solutions being relatively stable, particularly if stored in sealed ampoules or in brown glass containers. Products are produced which are crystalline in nature, and quite soluble in water. A white crystalline product, melting with decomposition at 120–121° C., which is apparently the bisulfite adduct of the quinone, is readily prepared by the treatment of the quinone with sodium bisulfite. Thus 1.72 parts of beta-methyl-alpha-naphthoquinone dissolved in about 10 parts of hot alcohol may be treated with a solution of 1.04 parts of sodium bisulfite in around 5 parts of water. Upon evaporation in a vacuum desiccator and crystallization of the residue from a mixture of chloroform and methyl alcohol, a white crystalline product, very soluble in water, somewhat unstable in the presence of air and light but quite stable when kept in brown bottles under nitrogen and having a melting point, with decomposition, of 120–121° C., is readily produced. Water solutions of this product are quite stable over long periods of time if sealed in ampoules, remaining clear and water white.

While we do not wish to be bound by any theory as to the exact chemical nature of this product, we believe that it is a bisulfite adduct of the type:

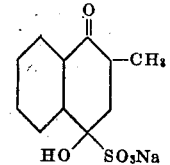

or

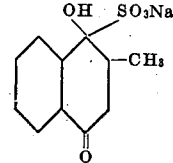

Thus on treatment with cold dilute acid, sulfur dioxide is envolved, while upon treatment with cold dilute caustic soda, free sulfite is liberated, as shown by titration with iodine.

The solutions described above are hypotonic, and for injection therapy are advantageously adjusted so that they are isotonic, as by the addition of sodium chloride. Such addition of sodium chloride, in the amounts required for isotonic solutions, does not interfere with the solubility or stability of the quinone or hydroquinone solutions.

We claim:

The sodium bisulfite adduct of beta-methyl-alpha-naphthoquinone, said product when crystallized from a mixture of chloroform and methyl alcohol existing as a white crystalline product, soluble in water, and which on treatment with cold dilute acid gives off sulfur dioxide and on treatment with cold dilute caustic soda liberates free sulfite as shown by titration with iodine.

ROBERT S. SHELTON.
MARCUS G. VAN CAMPEN, Jr.